Reissued Sept. 4, 1951

Re. 23,406

UNITED STATES PATENT OFFICE 23,406

NITRO-(2-THENOYL)-O-BENZOIC ACIDS

Henry R. Lee and Viktor Weinmayr, Pitman, N. J., assignors to E. I. du Pont de Nemours & Company, Wilmington, Del., a corporation of Delaware No Drawing. Original No. 2,513,573, dated July 4, 1950, Serial No. 723,670, January 22, 1947. Application for reissue February 9, 1951, Serial No. 210,277

4 Claims. (Cl. 260—332.2)

Matter enclosed in heavy brackets [ ] appears in the original patent but forms no part of this reissue specification; matter printed in italics indicates the additions made by reissue.

This invention relates to the preparation of new substituted (2-thenoyl)-o-benzoic acids, and more particularly to the preparation of nitro-(2-thenoyl)-o-benzoic acids of the formula:

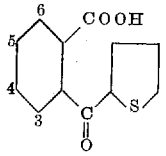

wherein any one of the positions 3, 4, 5 and 6 carry a nitro group, while the other three positions are unsubstituted.

It is an object of this invention to prepare new nitro-(2-thenoyl)-o-benzoic acids which are suitable as intermediates for the synthesis of other products, particularly dyes. A further object of the invention is to provide a commercially feasible process for the preparation of these new nitro-substituted (2-thenoyl)-o-benzoic acids.

The new nitro-(2-thenoyl)-o-benzoic acids of this invention may be prepared in good yields and purity by reacting the nitro-substituted phthalic anhydride with the Grignard reagent prepared from 2-bromo-thiophene or 2-iodo-thiophene. Certain of the compounds may be made by the Friedel-Crafts synthesis, that is, by the condensation of the nitro-phthalic anhydride with thiophene by the aid of aluminum chloride, or similar condensing agent.

The following examples are given to illustrate the invention. The parts are by weight.

EXAMPLE 1

Fourteen (14) parts of magnesium turnings and a fraction of a part of iodine were added to 350 parts of anhydrous ether. The reaction vessel was swept with dry nitrogen, and the entire reaction was carried out in a nitrogen atmosphere. 84 parts of 2-bromo-thiophene were mixed with 100 parts of anhydrous ether, and a small fraction of this solution was added to the charge containing the magnesium. As soon as the formation of the Grignard reagent had started, the remainder of the 2-bromo-thiophene solution was added over a period of one hour. During this addition, just enough external cooling was used to maintain the reaction mass at a vigorous reflux indicative of a satisfactory rate of reaction. The temperature of the charge at reflux was about 30° C. Refluxing was continued for about two hours after the addition of the 2-bromo-thiophene had been completed, and the mass was then cooled to about 20° C.

96.5 parts of 3-nitrophthalic anhydride were added to 1300 parts of benzene, previously dried over calcium chloride, and the suspension was heated to 40° C. The Grignard reagent, prepared as described above, was poured into the 3-nitrophthalic anhydride suspension at a temperature of 40° to 50° C. over a period of 10 minutes. The charge was agitated at about 50° C. for 2 hours after the addition of the Grignard reagent had been completed. Fifteen hundred (1500) parts of cold water and 5 parts of magnesium oxide were then added, and the charge was again refluxed for about an hour.

It was then filtered while still warm, and the solvent layer was separated from the barely alkaline aqueous solution of the magnesium salts of the mixture of the two isomeric nitro-(2-thenoyl)-o-benzoic acids. The solvent layer was discarded and the water layer was acidified with acetic acid until no further precipitate was formed.

The [6-nitro-(2-thenoyl)-o-benzoic] *3-nitro-(2-thenoyl)-o-benzoic* acid precipitated in a crystalline form. It was filtered off at about 20° C., washed with about 200 parts of cold water and dried. Forty-two (42) parts of [6-nitro-(2-thenoyl)-o-benzoic] *3-nitro-(2-thenoyl)-o-benzoic* acid were obtained, melting at 212°–213° C. and representing a yield of 30.6% of theory. After crystallization from 5 parts of nitrobenzene per part of keto acid, the pure [6-nitro-(2-thenoyl)-o-benzoic] *3-nitro-(2-thenoyl)-o-benzoic* acid was obtained melting at 216°–217° C. This isomer was relatively insoluble in chlorobenzene, requiring as much as 60 parts of it per part of product to get it into solution at the boil.

The acetic acid containing filtrate from above was made strongly acid with hydrochloric acid, and the second isomer, the [3-nitro-(2-thenoyl)-o-benzoic] *6-nitro-(2-thenoyl)-o-benzoic* acid, was precipitated. After filtering, washing and drying, it amounted to 27 parts (melting range 164° to 166° C.), equal to a yield of 19.5%, based on the 2-bromo-thiophene employed. When the [3-nitro-(2-thenoyl)-o-benzoic] *6-nitro-(2-thenoyl)-o-benzoic* acid was crystallized from 10 times its weight of chlorobenzene, it had a melting point of 170° C.

EXAMPLE 2

The Grignard reagent was prepared, as in Example 1, from 163 parts of 2-bromo-thiophene (or the equivalent amount of 2-iodo-thiophene), 28 parts of magnesium and 650 parts of ether. This solution was poured into a solution of 193 parts of 4-nitro-phthalic anhydride in 1600 parts of benzene over a period of about 10 minutes, while the temperature was held at 40° to 50° C. The charge was agitated at 45° to 55° C. for two hours longer, to complete the condensation. About 1500 parts of cold water and 5 parts of magnesium oxide were then added and the agitation was continued at 50° C. for several hours. The reaction mass was filtered, and the aqueous layer containing the nitro-(2-thenoyl)-o-benzoic acids as the magnesium salts was separated. Acetic acid was added to the aqueous solution until no further precipitate was formed. The crystalline precipitate was filtered, washed and dried. Sixty-one (61) parts of the crude [4-nitro-(2-thenoyl)-o-benzoic] *5-nitro-(2-thenoyl)-o-benzoic* acid, melting at from 187° to 190° C., was obtained, equal to a yield of 22% of theory. Crystallization of this crude from three times its weight of nitrobenzene gave the pure [4-nitro-(2-thenoyle)-o-benzoic] *5-nitro-(2-thenoyl)-o-benzoic* acid melting at 189°–190° C.

The acetic acid filtrate from above was made strongly acid with hydrochloric acid, and the precipitate was filtered, washed and dried. Ninety-two (92) parts of crude [5-nitro-(2-thenoyl)-o-benzoic] *4-nitro-(2-thenoyl)-o-benzoic* acid was obtained, melting from 145° to 147° C., equal to a yield of 33% of theory. This isomer was much more soluble in nitrobenzene than the [4-nitro-(2-thenoyl)-o-benzoic] *5-nitro-(2-thenoyl-o-benzoic* acid, and was therefore crystallized from about 4 parts of chlorobenzene per part of crude keto acid. The pure [5-nitro-(2-thenoyl)-o-benzoic] *4-nitro-(2-thenoyl)-o-benzoic* acid recrystallized from chlorobenzene melting at 149°–150° C.

EXAMPLE 3

Thirty (30) parts of anhydrous aluminum chloride and 19.3 parts of 4-nitro-phthalic anhydride were dissolved in 90 parts of nitrobenzene. Ten (10) parts of thiophene were added at a reaction temperature of from 55° to 62° C. over a period of one hour, and agitation of the mass at 55° to 60° C. was continued one hour longer. The reaction mass was then poured on dilute hydrochloric acid and steam distilled to remove the nitrobenzene. The residue was washed by decantation and then agitated in 800 parts of a 10% sodium carbonate solution. The insoluble product was removed by filtration, the filtrate was acidified, and the precipitate which formed was filtered off, washed and dried. Nine (9) *parts* of crude [4-nitro-(2-thenoyl)-o-benzoic] *5-nitro-(2-thenoyl)-o-benzoic* acid was thus obtained, melting from 178° to 182° C., equal to a yield of 32.5% based on 4-nitrophthalic anhydride. It was crystallized from about 14 parts of chlorobenzene per part of crude keto acid, and then melted at 189°–190° C.

It was identical with the [4-nitro-(2-thenoyl)-o-benzoic] *5-nitro-(2-thenoyl)-o-benzoic* acid prepared by the method described in Example 2.

Numerous variations of the methods described are possible. While the preferred method for obtaining any one of the four possible nitro-(2-thenoyl)-o-benzoic acids is the Grignard method, in certain instances as shown in Example 3 excellent results can also be obtained by the Friedel-Crafts methods. The Grignard reagent may be prepared in other ethers than diethyl ether, and [and] the amount of ether may be varied within wide limits. The reaction between the Grignard reagent and the nitro-phthalic anhydrides takes place with ease, and over a wide temperature range, as, for instance, below 0° C. to above 70° C. By properly choosing the condensation temperature, the ratio of the isomers can be influenced to some extent. Grignard reagent is preferably added to the solution, or suspension, of the nitro-phthalic anhydrides. The nitro-phthalic anhydrides may be dissolved in other solvents than benzene, as long as such solvents do not themselves react with the Grignard reagent. The time required for adding the Grignard reagent to the nitro-phthalic anhydrides may be varied and will mainly be dictated by such practical considerations as the cooling capacity available and the condensation temperature chosen.

The method of isolating the final nitro-(2-thenoyl)-o-benzoic acids can be varied widely and will depend upon purity desired for the final products. For many uses, a separation of the isomers may not be required. Reasonably pure isomers are obtained by acidifying the solutions of their salts in water first with a weak acid like acetic acid, then with a strong acid like hydrochloric acid. Similarly, the isomers can be separated by the different solubilities of their salts in water, or by different solubility of the free keto acids in organic solvents.

The nitro-(2-thenoyl)-o-benzoic acids of this invention are valuable intermediates in organic synthesis because of the reactivities of the nitro and carboxylic acid groups. They lend themselves particularly to the further condensation in the preparation of dyes.

We claim:

1. The nitro-substituted (2-thenoyl)-o-benzoic acids of the formula:

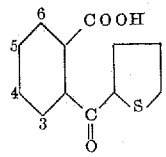

in which the $NO_2$ group is in one of the positions 3, 4, 5, and 6 while the remaining positions are substituted with hydrogen.

2. The 4-nitro-(2-thenoyl)-o-benzoic acid.
3. The 5-nitro-(2-thenoyl)-o-benzoic acid.
4. The 6-nitro-(2-thenoyl)-o-benzoic acid.

HENRY R. LEE.
VIKTOR WEINMAYR.

REFERENCES CITED

The following references are of record in the file of this patent or the original patent:

Bernthsen and Sudborough, "Organic Chemistry," Van Nostrand, N. Y., 1925 (1922 edition), page 549.

Whitmore, "Organic Chemistry," Van Nostrand, N. Y., 1937, page 893.

Thomas, "Anhydrous Aluminum Chloride," pages 510, 511, 512, and 540.

Steinkopf, Ann. 407, 97, 106 (1914).